UNITED STATES PATENT OFFICE.

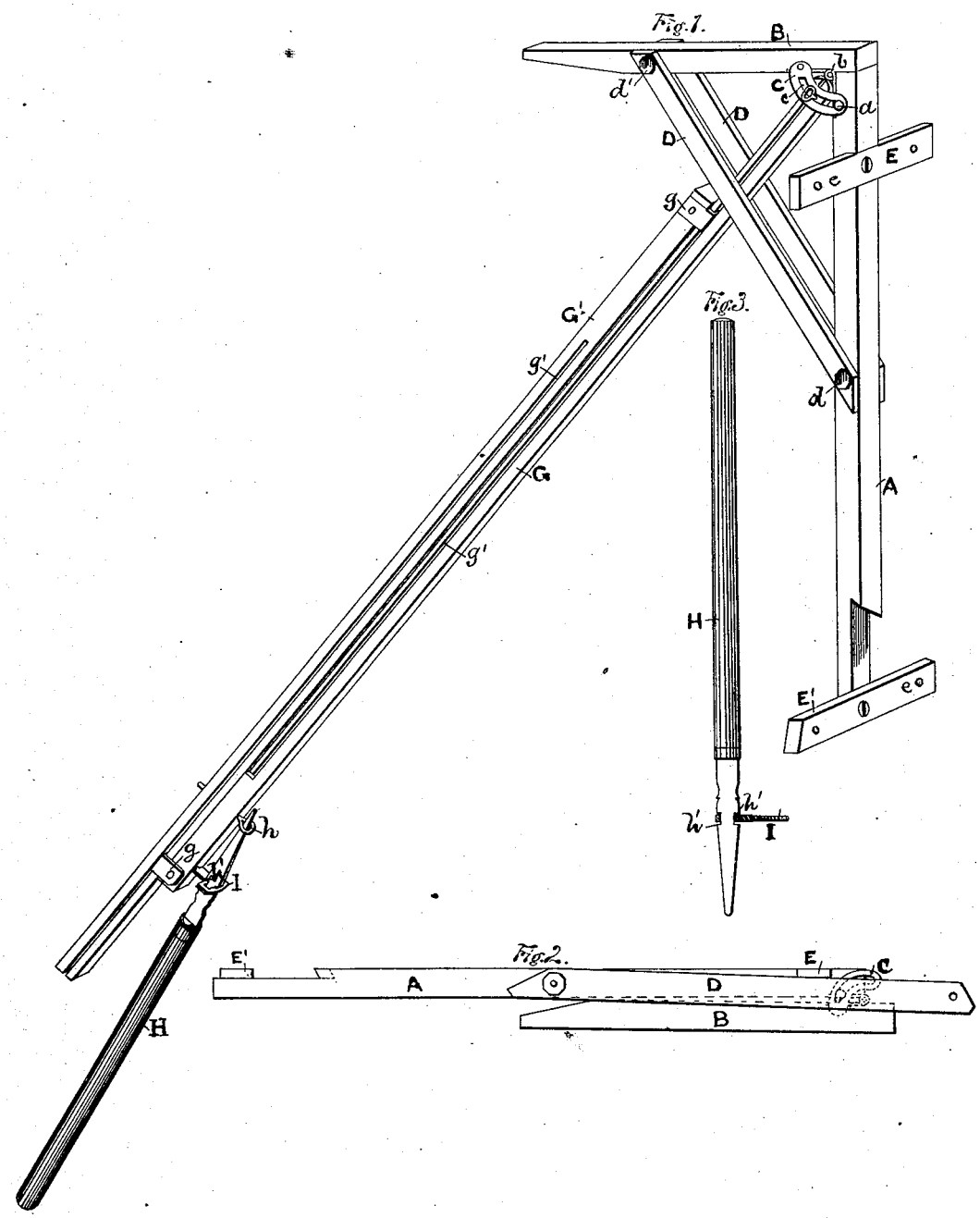

JOHN LAPP AND JOHN M. SWEET, OF BATAVIA, NEW YORK.

IMPROVEMENT IN SCAFFOLDS.

Specification forming part of Letters Patent No. 159,032, dated January 26, 1875; application filed July 1, 1874.

*To all whom it may concern:*

Be it known that we, JOHN LAPP and JOHN M. SWEET, of Batavia, in the county of Genesee and State of New York, have invented certain new and useful Improvements in Scaffolds; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Our invention relates to scaffolding for use by builders, or for other uses to which scaffolding may be applied; and the invention consists in a new and improved combination of devices whereby the scaffolding is more readily adjusted and taken apart, and more conveniently transported from place to place, all as hereinafter more fully set forth.

In the accompanying drawings, Figure 1 represents a perspective view of a portion of our improved scaffolding with the adjusting-brace connected therewith; Fig. 2, a view of the same portion of the scaffolding folded up ready for transportation. Fig. 3 is a detached view of the lever for adjusting the extension-bar.

A represents a vertical or upright bar, and B a horizontal bar, connected together by a hinge, $b$. C represents arc-shaped plates, placed one on each side of the bar B, and to which they are secured at one end. They are cut with arc-shaped slots $c$, through which are passed headed bolts $a$, secured to the bar A. D D are diagonal braces or bars, pivoted at their lower ends by a bolt, $d$, to the bar A, and secured at their upper ends to the bar B by a screw-bolt and nut, $d'$. E E' are short lateral bars, secured at right angles to the bar A, either rigidly, like bar E, or pivoted so as to turn around, like bar E'. These lateral bars are provided with bolt-holes $e$, for convenience of attachment to other parts of the scaffolding. G G' are bars, which together constitute the extension-brace. They are connected together by means of metal clasps or tongue-plates $g$, the turned-in end or tongue portions of which fit into longitudinal grooves $g'$, formed in the sides of the bars G G'. These grooves do not extend the whole length of the bars G G', as clearly shown in the drawing. Either or both of the bars G G' are pierced with a series of bolt-holes, through one or the other of which is passed a pin, $h$, for the purpose of securing them together at any given distance to which they may be extended. The upper end of the bar G is also pierced with a bolt-hole. H represents a pointed lever, having notches $h'$ formed in each side toward the point. I is a staple, secured to the lower end of the bar G. The extension-bar is connected to the scaffolding by inserting the end of bar G between the arc-shaped plates C, and passing a pin or headed bolt and nut through the slot $c$ and the hole in the upper end of bar G.

When put together as shown by Fig. 1 of the drawing, it will be obvious that the operator, by forcing the lever H inward, will withdraw the pin $h$ from the bar $g'$, and permit of the bars G G' being extended or contracted, by sliding the one upon the other, until the scaffolding is adjusted to the height or distance apart required, when, by pressing the lever outward again, the pin $h$ will again pass into one of the series of holes in bar G', and secure the two together.

It will also be obvious that, the end of the bar G being loosely connected to the bars A B by the pin passing through it and the slotted plates C, the extension-bar may be set at any required angle with relation to the bars A B, and without disturbing the relative perpendicular and horizontal position of the latter.

When it is desired to remove the scaffolding and transport it from one place to another the extension-bar is readily detached from the bars A B by withdrawing the pin or bolt which connects them. Then, by withdrawing the bolt $d'$, the bar B may be turned down upon the bar A, and braces D D turned upward, so as to bring the parts into position shown by Fig. 2 of the drawings, the bars D covering and protecting the plates C. The pin $h$ may be then withdrawn sufficiently to permit of the bars G G' sliding inwardly upon each other until their ends come together, and the lever H may be withdrawn from the staple I, and all the parts be packed in a small compass for convenience of transportation.

When the end of the lever H is inserted through the staple I by turning it half around, the shoulders of the notches $h'$ will retain it in position, and prevent it dropping out through the staple.

Having thus described our invention, what we claim as new, and desire to secure by Letters Patent, is—

1. The combination of the hinged bars A B, pivoted bars D D, arc-shaped plates C, and extension-bars G G', substantially as and for the purpose specified.

2. The lever H, constructed as described, and arranged to operate with the staple I, pin $h$, and bars G G', substantially as and for the purpose specified.

In testimony that we claim the foregoing as our own we affix our signatures in presence of two witnesses.

JOHN LAPP.
JOHN M. SWEET.

Witnesses:
R. S. LEWIS,
ALVIN J. FOX.